Dec. 8, 1931.   M. R. BECKER   1,834,998
METHOD OF AND MACHINE FOR MANUFACTURING ROOFING MATERIAL
Filed June 17, 1929   2 Sheets-Sheet 1
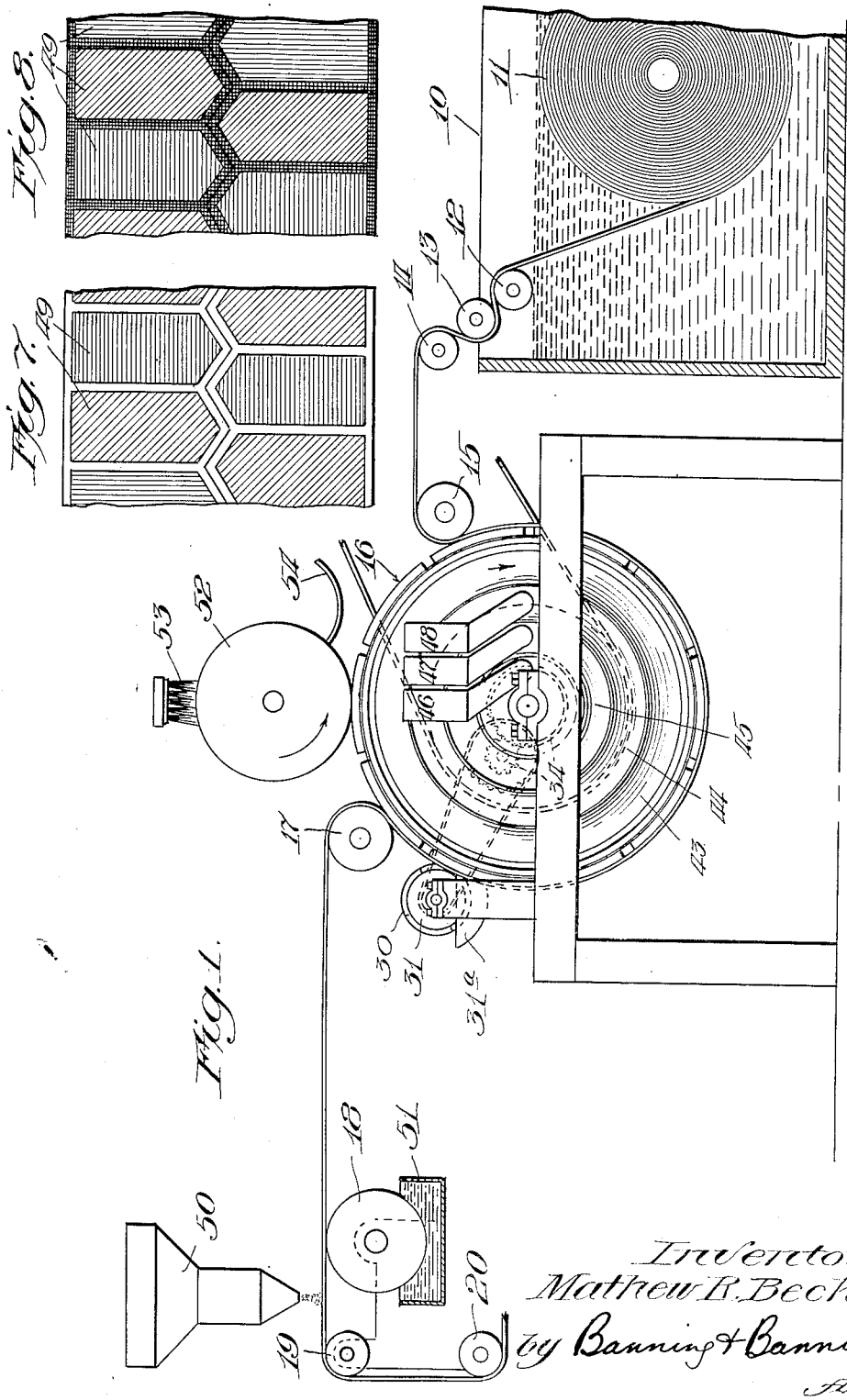

Dec. 8, 1931. M. R. BECKER 1,834,998
METHOD OF AND MACHINE FOR MANUFACTURING ROOFING MATERIAL
Filed June 17, 1929 2 Sheets-Sheet 2
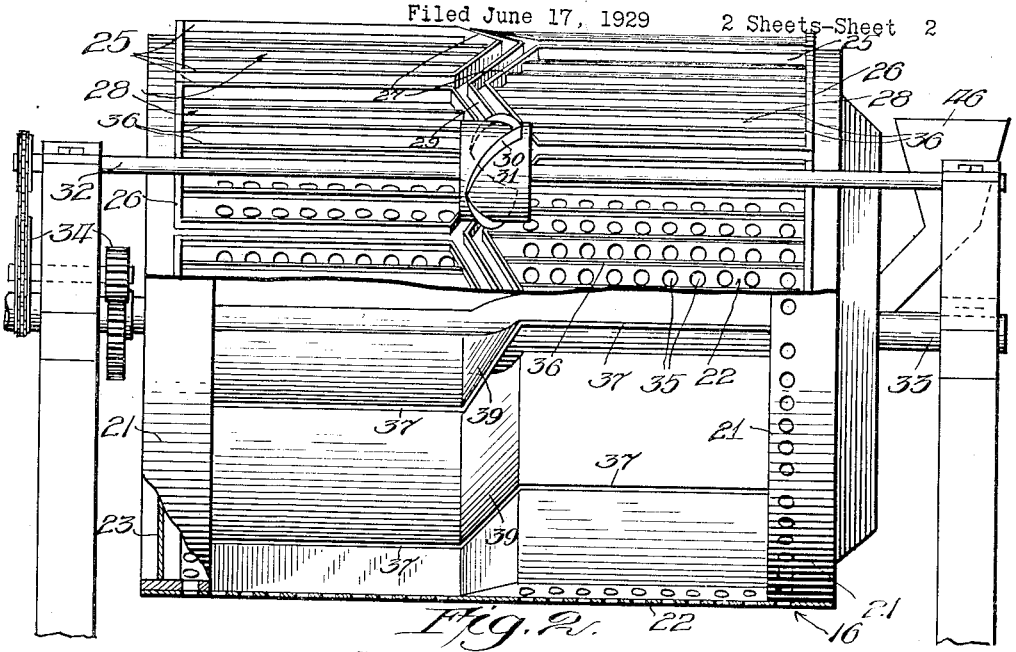
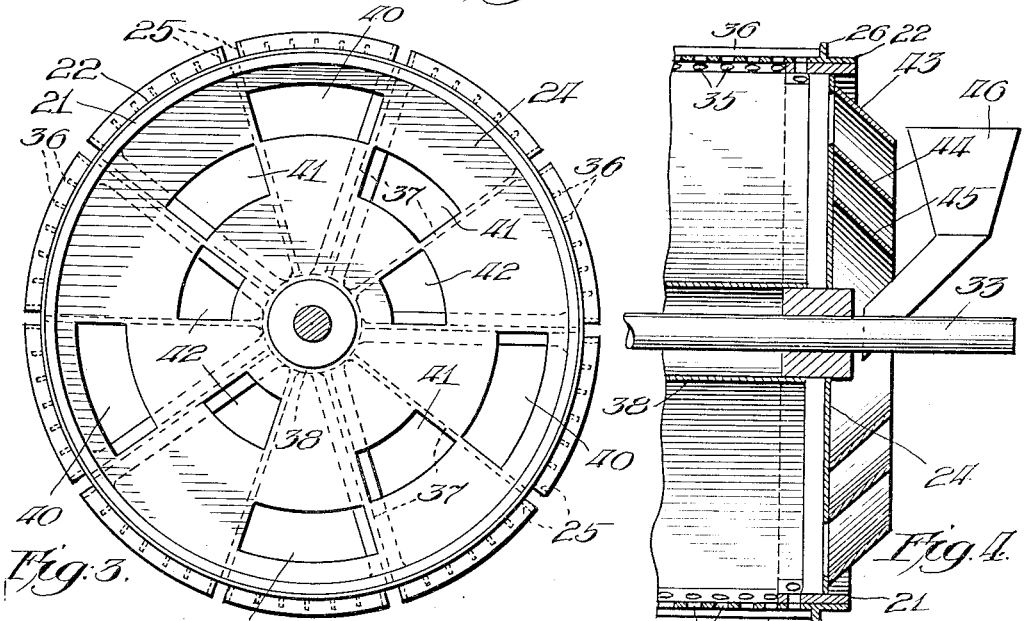
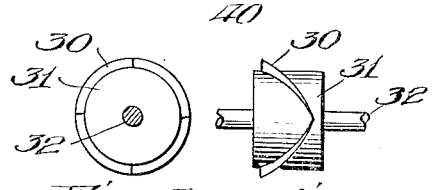
Inventor:
Mathew R. Becker
by Banning + Banning
Attys Patented Dec. 8, 1931

1,834,998

UNITED STATES PATENT OFFICE

MATHEW R. BECKER, OF KENILWORTH, ILLINOIS, ASSIGNOR TO BECKER ROOFING COMPANY, OF CHICAGO, ILLINOIS, A CORPORATION OF ILLINOIS

METHOD OF AND MACHINE FOR MANUFACTURING ROOFING MATERIAL

Application filed June 17, 1929. Serial No. 371,580.

This invention relates to methods of and machines for manufacturing roofing material, and particularly composition roofing having an asphalt surface to which crushed stone or the like is applied.

One of the objects of the invention is to provide a method whereby zones or panels of different colored stone can be applied successively.

A further object of the invention is to provide a method whereby a plurality of different colored stones or gritty material may be applied simultaneously to separate zones, and a different gritty material applied subsequently to other zones.

A further object of the invention is to provide a method whereby crushed stone or the like may be applied to portions of adhesive asphalt coated roofing, the excess removed therefrom, crushed stone of different color be applied to the complete surface of the roofing material, and the excess removed therefrom.

A further object of the invention is to provide a machine for applying crushed stone or the like of several different colors to separate zones of roofing material while protecting portions of the material from becoming coated.

A further object of the invention is to provide a machine which is adapted to apply crushed stone or the like of several different colors in separate panels to roofing material, and remove the excess stone from said panels, leaving vacant spaces between said panels and applying stone of a still different color to said spaces so as to completely coat the roofing material.

Other objects, advantages, and capabilities will later more fully appear.

My invention further resides in the combination, construction and arrangement of parts illustrated in the accompanying drawings, and while I have shown herein a preferred embodiment, I wish the same to be understood as illustrative only, and not limiting the scope of my invention.

In the drawings,—

Figure 1 is a diagrammatic general view of the machine in elevation;

Fig. 2 is an elevational detail of the main drum of the machine, part of the surface thereof being broken away to show the arrangement of the interior partitions;

Fig. 3 is an end view of said drum with certain parts removed to show the ports by which the ground stones of various colors are introduced into the various compartments thereof;

Fig. 4 is a sectional detail of the feed-end of said cylinder;

Figs. 5 and 6 are side and front elevations of the cutter or knife which co-operates with said cylinder;

Fig. 7 is a plan view of a strip of roofing material at an intermediate point of manufacture; and Fig. 8 is a similar view of completely coated material.

Referring to the drawings, the numeral 10 designates a bath of molten asphalt in which a roll 11 of suitable fabric to form the base of the roofing composition is soaked and retained while being unrolled and fed through the machine. The fabric passes over rolls 12, 13 and 14 which may be manipulated so as to adjust the coating on the fabric in known manner. The fabric then passes over a roll 15 which applies it to the main drum 16 of the machine at a point which is preferably above the level of the axis thereof. The fabric passes downwardly over the surface of said drum, and extends upwardly on the other side thereof to a substantial distance above said axis, where it becomes detached from the drum passing over roll 17, the clay roll 18, and the rolls 19 and 20 which cause it to move downwardly and become inverted.

The drum 16 is preferably built upon two pulleys 21, and comprises a cylindrical sheet 22 and end plates 23 and 24. The circumferential sheet 22 is provided with a system of upstanding partitions 25, 26 and 27 which are so arranged as to constitute a system of similar panels 28 symmetrically arranged upon the surface of the drum. The partitions 25 extend longitudinally of the drum from points near the ends thereof, to points somewhat short of the center of the drum.

As shown in Fig. 2, the partitions 25 are arranged in adjacent pairs, and the pairs of partitions 25 on the left-hand half of the drum are alternately arranged with those on the right-hand half of the drum.

Near the ends of the drum are provided a series of upstanding partitions 26 which connect one of the partitions 25 of an adjacent pair to the nearest partition 25 of the next pair. The partitions 27 complete the panels 28, said partitions being located so as to form a zig zag path around the center of the drum, the partitions 27 being in parallel relation so as to form said path. Each panel 28 comprises an apical portion formed by two partitions 27. Due to the alternation of the pairs of longitudinal partitions 25 on the left and right-hand halves of the drum, the apical portions of the panels 28 are interwoven, as will be readily seen in Fig. 2, or be readily understood from Figs. 7 and 8, the panels of colored material shown thereon being co-extensive with the panels 28.

In the center of the zig zag path on channel constituted by the partitions 27 is provided a zig zag cutting edge 29 which is adapted to co-operate with a knife 30 mounted upon a roll 31, which is carried by a shaft 32 and suitably driven in unison with the drum 16. The knife 30 is located circumferentially of roll 31 and zig zags laterally thereof, as shown in Figs. 2 and 6, and the shaft 32 is driven at such a rate that the knife 30 remains in contact with the zig zag cutting edge 29, so that the roofing material is sheared therebetween. To effectuate this object, the shaft 32 is driven from the shaft 33 of the drum 16 by means of suitable gears, referred to generally as 34, which are so adjusted that the peripheral speed at the cutting edge is the same both for the roll 31 and the drum 16.

At its lowermost position, the knife 30 is immersed in soap solution maintained in a dish 31ª so that the cut in the roofing material becomes coated with a film of such solution for the purpose of preventing the asphalt on the severed portions from adhering together again.

The circumferential sheet 22 within the panels 28 is provided with numerous perforations 35, and preferably a plurality of small upstanding fins or partitions 36 is provided for the purpose of preventing excessive and violent movement of excess stone upon the surface to be coated.

The drum 16 is divided internally into a plurality of compartments by means of longitudinal partitions 37 which extend radially from a hollow tube 38 which encloses the shaft 33, to the underside of the channels formed by the adjacent partitions 25. The partitions 37 terminate approximately at the inner ends of said channels, and their inner ends are connected by small oblique partitions 39, so arranged that each compartment on the inner side of each of the panels 28 on the left-hand side of Fig. 2 communicates with a compartment on the right-hand side.

The end plate 24 of the drum 16 is provided with a plurality of perforations, shown in Fig. 3, and designated 40, 41 and 42. The openings 40, 41 and 42 are located within concentric zones which do not overlap. Three frusto-conical partitions of metal 43, 44 and 45 are applied to the end plate 24 so as to locate the openings 40 between the outer partition 43 and the intermediate partition 44, the openings 41 between the intermediate partition 44, and the innermost partition 45, and the openings 42 within the inner partition 45. As will readily be seen from Fig. 4, the larger circumferences of the partitions 43, 44 and 45 are applied to the plate 24.

Three hoppers 46, 47 and 48 are provided adjacent the feed-end of the drum 16, and are adapted to be supplied with regulable quantities of crushed stone or the like, which may or may not be of contrasting colors. The hopper 46 discharges ground stone into the pocket formed by the partition 45 and the end plate 24, said stone falling to the lowest part of said pocket from which it is supplied to the ports 42 when the same arrive at said lowest point during the rotation of the drum. Said stone is consequently automatically supplied through said ports into the connecting compartments within the drum.

The hopper 47 feeds into the space between the partitions 44 and 45 so that the stone therefrom is supplied to the ports 41. The hopper 48 feeds into the space between the partitions 43 and 44 so that the stone therefrom is supplied to the ports 40. As will be seen in Fig. 1, it is preferred to discharge the stone from the hoppers 46, 47 and 48 at approximately the same level as the axis of the drum on the side thereof which is moving downwardly. As indicated above, regulating means (not shown) are provided for controlling the rate of supply of crushed stone to the hoppers 46, 47 and 48. It will be noted from Fig. 4, that in case of excessive supply of stone to any one of the hoppers, the excess will fall over the lowermost point of the outer edges of the partitions 43, 44 and 45 to the ground, and will not contaminate stone of different colors which is being supplied to other compartments.

It will be understood that during the rotation of the drum the stone supplied by the ports 40, 41 and 42 to the compartments within the drum will be automatically distributed throughout the length of the drum so that perfect coating of the roofing material is attained. As the drum rotates the stone which is located at the apical portion of a compartment, said compartment being directed upwardly, falls downwardly through said compartment and passes through the openings 35 in the cylindrical wall 22, so that it coats the wet asphalt coated face of the roofing material. As the compartment ascends during the continued rotation of the drum, the excess stone falls backwardly into the compartment.

Where stone of various colors is supplied to the hoppers 46, 47 and 48, said stone is applied in the form of panels of different colors, as indicated at 49 in Fig. 7. These panels are surrounded by uncoated portions which are preferably in the form of relatively narrow strips. It will be readily understood that an uncoated zig zag strip is left up the center. The knife 30 in co-operation with the cutting edge 29 severs the strip of roofing material in a zig zag line centrally of the zig zag path referred to. Since said zig zag path is left uncoated, the cutting edges are protected from engagement with the stones.

After the fabric is removed from the drum it passes in a horizontal path between the rolls 17 and 19, and the partially stone coated surface receives a uniform coating of a colored stone, preferably of dark or black color, from the discharging hopper 50. Said dark stone adheres to the uncoated portions of the surface, but is prevented from adhering to the panels 49 by the colored stone previously applied thereto. After passing over the roll 19, the fabric takes a vertical path and then turns backwardly over the roll 20 so that the excess stone supplied from the hopper 50 falls from the completely coated roofing material.

While passing between the rolls 17 and 19 the underside of the roofing material comes into contact with the roll 18, which dips into a bath 51 which contains a suspension of clay so that the underside is rendered nonadhesive. While any suitable suspension may be employed, it if preferred to use a suspension of bentonite, ground mica, and talc in water for this purpose.

In order to keep the outer surface of the drum 16 clean a cleaning roll 52 is provided which contacts with the outer surfaces of the partitions 25, 26 and 27 and the cutting edge 29. This roll is preferably mounted vertically above the axis of the drum 16. Longitudinally of the roll 52 and at its upmost part, a brush 53 is provided which is periodically supplied with a soap solution. The brush 53 maintains the roll 52 covered with such solution, and prevents the passage of stone collected by the roll from the drum 16. Such stone mixed with soap solution accumulates on the upwardly moving side of the roll 52, and gradually collects in a pan 54 suitably located to receive same.

The final product is illustrated in Fig. 8. It consists of a strip of roofing material cut in a zig zag line down its center, and provided with panels 49 of colored stone surrounded by strips of darker colored stone. It is preferred not to separate the two portions of the strip, since there is sufficient adhesion between same to enable the material to be made up into rolls which may be separated at the work. The soap solution which is applied by the knife 30 prevents the asphalt from becoming permanently sealed along the zig zag cut.

It will be understood that similar stone may be supplied to the hoppers 46, 47 and 48, in which case the panels 49 will all be of the same color. It is preferred to supply different colored stone to these hoppers, and it will be readily understood that the sequence of colors obtained will depend upon the location of the ports 40, 41 and 42, the location of which can be altered as desired. Furthermore, while I have illustrated a machine adapted to apply panels of three different colors, it is obvious that the machine may readily be constructed so as to apply any greater or less number of colored stones.

For the purpose of illustration, if it is assumed that red stone is supplied to the hopper 46, blue stone to the hopper 47, and green stone to the hopper 48, then the sequence of the colored panels 49 with the ports shown in Fig. 3, will be red, green, red, green, blue, green, red, blue, green and blue.

After passing over the roller 20, the finished severed strips of roofing material, in intermeshing juxtaposition pass to the usual cooling racks (not shown) and apparatus (not shown) for forming same into rolls of predetermined length. The intermeshing projections on each strip and a certain small adherence between the severed portions enable them to be handled as a single strip which is separated at the work.

I claim:

1. The method of manufacturing roofing material which comprises coating a strip of fabric with molten asphalt, applying colored crushed stone in spaced panels arranged in two series longitudinal of the strip, severing the strip longitudinally along the uncoated portion between the two series, and applying soap to the freshly cut edges to prevent recementing the same.

2. The method of manufacturing roofing material which comprises coating a strip of fabric with molten ashpalt, applying colored crushed stone in spaced panels having pointed intermeshing portions, cutting the strip longitudinally on a zig zag line between said intermeshing portions, and applying stone of a different color to the complete surface of the fabrics to completely coat same.

3. The method of manufacturing roofing material which comprises coating a strip of fabric with molten asphalt, applying crushed stone of various colors in the form of spaced panels having pointed intermeshing portions spaced apart to leave an uncoated zig zag path longitudinally of the strip, cutting the strip longitudinally along a zig zag line in the center of said zig zag path, coating the cut edges with material to render said edges substantially non-adherent and thereafter coating the uncoated portions of the surface with dark colored stone.

4. The method of manufacturing roofing material which comprises coating a strip of fabric with molten asphalt, applying crushed stone in the form of spaced panels of different colored stone, said panels having pointed intermeshing portions spaced apart to leave an uncoated zig zag path longitudinally of the strip, cutting the strip longitudinally along a zig zag line in the center of said zig zag path while coating the cut edges with soap solution and thereafter applying stone of a still different color to the complete surface and removing excess therefrom.

5. A machine for manufacturing roofing material comprising a rotatable drum divided superficially into spaced panels by upstanding spaced partitions, radial compartments within said drum, said drum being perforated within the panels so that each of said panels communicates with a compartment, one end of the drum being provided with openings, each opening communicating with one of said compartments, said openings being arranged in a plurality of zones, means for supplying crushed stone of different colors to each of said zones.

6. A machine for manufacturing roofing material comprising a rotatable drum divided superfically into spaced panels by upstanding spaced partitions, radial compartments within said drum, said drum being perforated within the panels so that each of said panels communicates with a compartment, one end of the drum being provided with openings, each opening communicating with one of said compartments, said openings being arranged in a plurality of zones, outwardly conveying frustro-conical partitions carried by said end of the drum and forming the boundaries of said zone, conduit means extending between said partitions for supplying crushed stone of different colors to each of said zones.

7. A machine for manufacturing roofing material comprising a rotatable drum divided superficially into spaced panels by upstanding spaced partitions, said panels being located in a plurality of adjacent spaced circumferential series, said drum being provided with perforations whereby stone supplied to the interior of the drum passes therethrough to coat said panels with stone leaving the spaces adjacent said panels uncoated, a cutting edge on said drum in the space between said series, and a cutter rotatable oppositely to said drum with equal surface speed and adapted to co-operate with said cutting edge to sever the roofing material longitudinally along an uncoated part.

8. A machine for manufacturing roofing material comprising a rotatable drum divided superficially into spaced panels by upstanding spaced partitions, said panels being located in a plurality of adjacent spaced circumferential series, said drum being provided with perforations whereby stone supplied to the interior of the drum passes therethrough to coat said panels with stone leaving the spaces adjacent said panels uncoated, a cutting edge on said drum in the space between said series, a cutter rotatable oppositely to said drum with equal surface speed and adapted to co-operate with said cutting edge to sever the roofing material longitudinally along an uncoated part, and a bath adapted to contain soap solution in which said rotatable cutter is immersed as it rotates.

9. A machine for manufacturing roofing material comprising a rotatable drum divided superficially into spaced panels by upstanding spaced partitions, the drum being perforated within said panels to permit stone to pass therethrough, and a plurality of smaller partitions in each panel and longitudinally of the drum to prevent excessive abrasive movement of said stone as the drum rotates.

10. A machine for manufacturing roofing material comprising a rotatable drum divided superficially into spaced panels by upstanding spaced partitions, said panels having intermeshing pointed portions leaving a circumferential zig zag path therebetween, an upstanding zig zag cutting member located centrally of said path, a rotary knife carrier, a knife extending circumferentially and zig zagging laterally on said carrier, a drive for said carrier operated from the drum, the drive and disposition of said knife being such that it cooperates with said zig zag cutting member as the drum and carrier rotate, and a bath for soap solution in which said knife is immersed as it rotates.

11. A machine for manufacturing roofing material comprising a drum adapted to apply stone to zones of a hot asphalt coated fabric leaving a longitudinal zone uncoated with stone, cutting means adapted to sever the fabric longitudinally within said uncoated zone along a wavy line, means for applying soap solution to said cutting means to prevent recementing of the hot asphalt along said cut, and means for handling the severed fabric as a unit so that the severed portions remain in juxtaposition until it is desired to apply same to a roof.

12. A machine for manufacturing roofing material comprising a drum adapted to apply stone to zones of a hot asphalt coated fabric leaving a longitudinal zone uncoated with stone, a cutting edge on said drum adapted to make contact with said uncoated zone, a cutter rotatable oppositely to said drum with equal surface speed adapted to co-operate with said cutting edge to sever the roofing material longitudinally along said uncoated part, means for applying soap solution to said knife to prevent strong adhesion between the severed portions, the line of severance being wavy so that the adjacent severed strips are provided with intermeshing portions, and means for forming the severed strips in juxtaposition into a roll.

13. A machine for manufacturing roofing material comprising a rotatable drum divided superficially into spaced panels by upstanding spaced partitions, said panels having intermeshing pointed portions leaving a circumferential zig zag path therebetween, an upstanding zig zag cutting member located centrally of said path, a rotary knife carrier, a knife extending circumferentially and zig zagging laterally on said carrier, a drive for said carrier operated from the drum, the drive and disposition of said knife being such that it co-operates with said zig zag cutting member as the drum and carrier rotate, a bath for soap solution in which said knife is immersed as it rotates, means for completing the coating of the material, means for cooling the material, and means for forming the severed strips into a single roll.

14. The method of manufacturing roofing material which comprises applying crushed stone to parts of the surface of fabric coated with hot asphalt, cutting said fabric longitudinally along a wavy line, applying soap to the section, completely coating the material with crushed stone, and forming same into rolls each comprising two severed portions.

15. The method of manufacturing roofing material which comprises applying crushed stone to parts of the surface of fabric coated with hot asphalt, cutting said fabric longitudinally along a wavy line along a central zone uncoated with stone, applying soap to the section, applying stone to the uncoated portions of the fabric, cooling the fabric, and forming the same into rolls each comprising intermeshing weakly adhering strips which can be readily pulled apart when desired.

16. The method of manufacturinng roofing material which comprises applying crushed stone in the form of spaced panels to the surface of fabric coated with hot asphalt, said panels having pointed intermeshing portions separated by a zig zag zone uncoated by stone extending longitudinally of the material, severing the strip by a zig zag line of section in said zone by a knife and cutting member, applying soap solution to knife so that the material is covered by soap along the line of section, completely coating the fabric with stone and forming the material into rolls, each comprising two severed portions in intermeshing relation.

17. The method of severing a roofing material having thereon a coating of asphaltum in fluid state which consists in pressing through the material a knife covered with a dissolved substance which fills the cut to prevent reuniting of the material by fluid asphaltum.

18. The method of severing a roofing material having thereon a coating of liquid asphalt which consists in pressing through the material a knife covered with a soap solution which fills the cut to prevent reuniting of the material by liquid asphalt.

19. In a machine for operating upon roofing material the combination of means for applying to such material longitudinally liquid asphalt, means for severing the material into sections, and means co-operating with the severing means for applying to the cut edges of the material a substance which prevents the asphalt from reuniting the severed sections.

20. The method of preparing asphalt coated fabric roofing material which comprises cutting said material longitudinally along a wavy line, applying soap to the section, and forming the material into a roll comprising two severed portions held together by engagement between their overlapping surfaces.

In testimony whereof, I have hereunto set my hand this 11th day of June, 1929.

MATHEW R. BECKER.